US00RE41809E

(19) United States
(12) Reissued Patent
Hinshaw et al.

(10) Patent Number: US RE41,809 E
(45) Date of Reissued Patent: Oct. 5, 2010

(54) AUTOMATIC MATTRESS SELECTION SYSTEM

(75) Inventors: W. Eric Hinshaw, Mebane, NC (US); Thomas I. McLean, Burlington, NC (US)

(73) Assignee: Kingsdown, Inc., Mebane, NC (US)

(21) Appl. No.: 12/019,343

(22) Filed: Jan. 24, 2008

Related U.S. Patent Documents

Reissue of:
(64) Patent No.: 6,990,425
Issued: Jan. 24, 2006
Appl. No.: 10/849,124
Filed: May 20, 2004

U.S. Applications:
(63) Continuation of application No. 10/346,117, filed on Jan. 17, 2003, now Pat. No. 6,741,950, which is a continuation of application No. 09/722,592, filed on Nov. 28, 2000, now Pat. No. 6,571,192.

(51) Int. Cl.
*G06F 15/00* (2006.01)
*G06Q 30/00* (2006.01)
*A47C 20/00* (2006.01)

(52) U.S. Cl. ..... 702/129; 702/139; 702/173; 705/26; 5/632

(58) Field of Classification Search ..... 702/129, 702/139, 127, 128, 173, 174, 186, 188; 705/26, 705/27; 5/632, 633; 600/529, 557, 587
See application file for complete search history.

(56) References Cited

U.S. PATENT DOCUMENTS

| | | | |
|---|---|---|---|
| 4,669,302 | A | 6/1987 | Wagner et al. |
| 4,982,466 | A | 1/1991 | Higgins et al. |
| 4,989,283 | A | 2/1991 | Krouskop |
| 5,061,174 | A | 10/1991 | Gross |
| 5,062,169 | A | 11/1991 | Kennedy et al. |
| 5,129,115 | A | 7/1992 | Higgins et al. |
| 5,148,706 | A | 9/1992 | Masuda et al. |
| 5,231,717 | A | 8/1993 | Scott et al. |
| 5,692,501 | A | 12/1997 | Minturn |
| 5,794,288 | A | 8/1998 | Soltani et al. |
| 5,848,450 | A | 12/1998 | Oexman et al. |
| 5,963,997 | A | 10/1999 | Hagopian |
| 5,970,789 | A | 10/1999 | Meyer et al. |
| 5,983,201 | A | 11/1999 | Fay |
| 5,993,400 | A | 11/1999 | Rincoe et al. |

(Continued)

FOREIGN PATENT DOCUMENTS

| | | | |
|---|---|---|---|
| CA | 2 335 400 | A1 | 5/2002 |
| JP | 04-325116 | | 11/1992 |
| JP | 06-022833 | | 2/1994 |
| JP | 06-258134 | | 9/1994 |
| JP | 2000-172769 | | 6/2000 |
| JP | 2002-078574 | | 3/2002 |
| JP | 2006-314822 | | 11/2006 |
| MX | PA 01012215 | A | 5/2003 |
| WO | 99/18827 | A1 | 4/1999 |
| WO | 00/59346 | A1 | 10/2000 |
| WO | 02/44677 | A1 | 6/2002 |

OTHER PUBLICATIONS

Office Action from Canadian Intellectual Property Office for Application No. 2,335,400, May 14, 2009, pp. 1–7, Canada.

*Primary Examiner*—Bryan Bui
(74) *Attorney, Agent, or Firm*—Sughrue Mion, PLLC

(57) ABSTRACT

A person shopping for a mattress is helped to select a physiologically suitable mattress by a system which uses a questionnaire to elicit important information from the person. The questionnaire is processed automatically to generate a recommendation of which available mattress system is most suitable for the person.

2 Claims, 14 Drawing Sheets

U.S. PATENT DOCUMENTS 6,571,192 B1 5/2003 Hinshaw et al.
6,585,328 B1 7/2003 Oexman et al.
6,741,950 B2 5/2004 Hinshaw et al.
2001/0013147 A1 8/2001 Fogel
2001/0042028 A1 11/2001 Yoshida
2002/0013743 A1 * 1/2002 Shoffner ..... 705/27

* cited by examiner

AUTOMATIC MATTRESS SELECTION SYSTEM

Matter enclosed in heavy brackets [ ] appears in the original patent but forms no part of this reissue specification; matter printed in italics indicates the additions made by reissue.

*CROSS-REFERENCE TO RELATED APPLICATIONS*

[This application] *This is a Reissue Application of application Ser. No. 10/849,124 filed May 20, 2004, now U.S. Pat. No. 6,990,425, which* is a continuation of application Ser. No. 10/346,117, filed Jan. 17, 2003 now U.S. Pat. No. 6,741,950, which was a continuation of Ser. No. 09/722,592, filed Nov. 28, 2000, now U.S. Pat. No. 6,571,192. *The entire disclosures of the prior applications and patents are hereby incorporated by reference in their entirety.*

BACKGROUND OF THE INVENTION

This invention relates to a system for aiding bedding purchasers in their selection of a mattress and box spring combination according to their physiology and habits.

A good night's sleep is so important that most people are willing to pay a premium for a mattress system which is particularly comfortable. The increased recognition of the health benefits of sleeping well makes such expenditures rational.

Many people find the experience of purchasing bedding confusing and dissatisfying. Reasons for this include: (1) mattress purchases are made only a few times per lifetime, (2) one cannot examine the interior of the product being purchased and must therefore (3) rely on the expertise of commissioned salesmen who may tend to recommend products they have in stock, and (4) it is difficult to comparison price shop because of the very large number of mattress manufacturers and models, and the absence of standardized mattress ratings.

It would be helpful to bedding purchasers to have an automatic system which could analytically and fairly measure physiological parameters important to mattress selection, and then automatically recommend a bedding product most suitable for the purchaser. Such a system, if placed in a store, would give customers an unbiased recommendation.

SUMMARY OF THE INVENTION

An object of the invention is to enable mattress distributors and the like to measure the sleeping attributes of potential customers at sites convenient to the customers, so that properly designed bedding can be selected.

It is important that a measuring system be fast, accurate and not embarrassing or uncomfortable for the subject. Therefore, it is an object of this invention to provide a measuring system which requires only that the subject answer a few basic questions (height, age gender, etc.), and then lie on a test bed for a few moments, in order to produce a recommended bedding selection.

Another feature of the invention is to enable a purchaser who does not have access to the test bed to obtain a mattress recommendation based entirely on answers to a questionnaire. For example, a person buying a mattress could obtain a recommendation for him- or herself by the method described above, and then in addition enter information about the absent partner so that a bedding recommendation for the couple jointly could be obtained. This questionnaire-only method could also be used by people shopping remotely, e.g., over the internet.

These and other objects are attained by mattress selection system as described below.

BRIEF DESCRIPTION OF THE DRAWINGS

In the accompanying drawings,

FIG. 2 represents a main menu of a computer display;

FIG. 3 shows a graphic submenu continuing from option 4 of FIG. 2, and FIG. 4 shows a further submenus continuing from option 7 of FIG. 3.

FIG. 5 illustrates the starting sequence of the diagnostic system.

FIG. 6 shows the flow of a questionnaire.

FIG. 7 is a flow diagram illustrating a method of setting up a diagnostic bed.

FIG. 8 shows the steps of obtaining a physiological profile a subject.

FIG. 9 illustrates an image base.

FIGS. 10–14 show, in successive linked diagrams, a method for determining a sleep coefficient based on questionnaire data and physiological data.

DESCRIPTION OF THE PREFERRED EMBODIMENT

Figure 1:
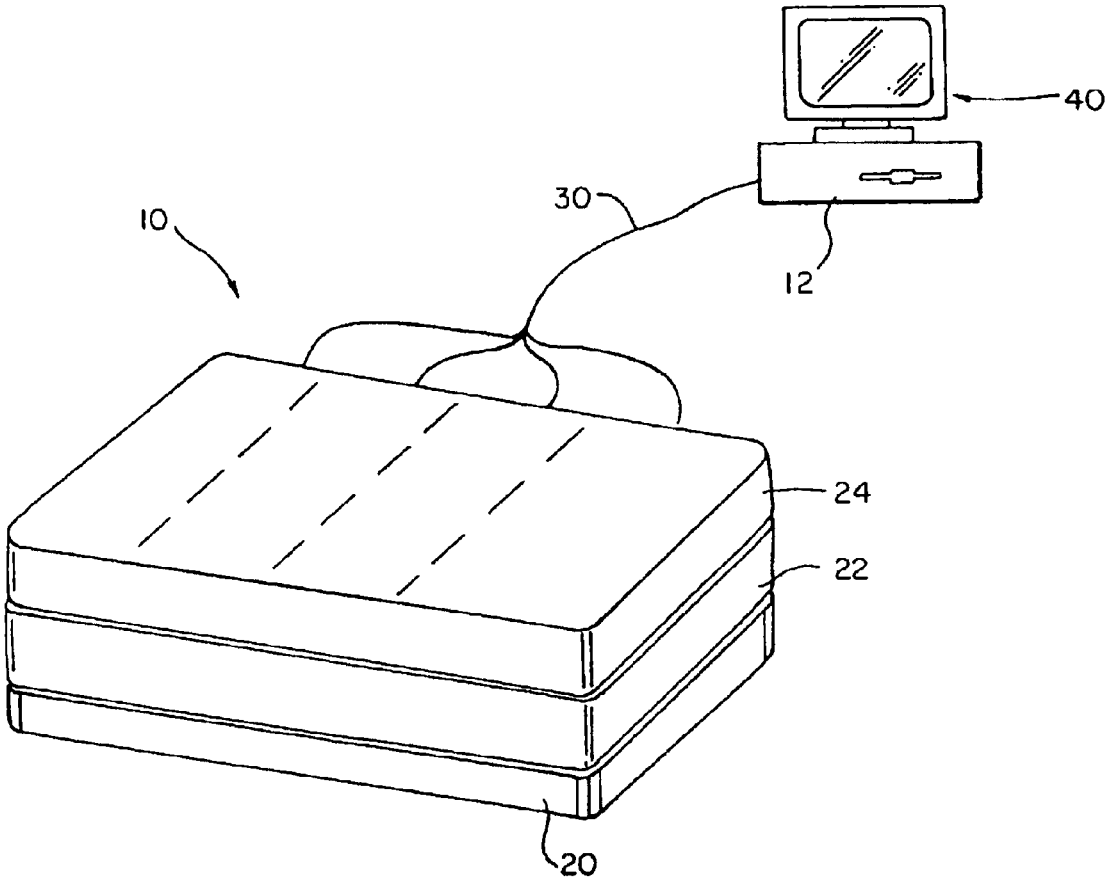
FIG. 1 is an exploded isometric view of a test bed embodying the invention.

A sleep analysis system for aiding bed selection comprises a measuring apparatus 10 which produces electrical outputs that are processed by a computer 12 which processes the outputs in a manner directed by a program (FIGS. 2–14) to generate an output in the form of a bed coefficient which can be used to select bedding.

The test bed comprises a frame 20 which supports a box spring 22 and a compartmented air mattress 24. The cells of the air mattress are divided into anatomical zones. When a subject lies on the mattress, different pressures are produced at each zone. The pressure readings are converted to electrical signals by appropriate transducers, not shown, and those signals are communicated over a multi-conductor cable 30 as inputs to a central processing unit, for example a personal computer 40. The computer reads the various inputs and processes them, in accordance with instructions from a program (software) which has been loaded on the computer previously, or which perhaps is accessed through a network such as the internet.

While it would be possible to custom-build a mattress system precisely for the subject, from the data collected, it is presently contemplated to provide the store with a small number (e.g., four) of mattress systems spanning a range of characteristics, and to provide a recommendation for one of those, based on the closest fit of the data.

We have found that the data from the pressure-sensor array can be substantially enhanced by eliciting additional information from the subject. A brief questionnaire is used for this purpose. There is an inverse relationship between the amount of questionnaire data needed and the amount of sensor data available. We have found that, in addition to the sensor data, only four questions need be answered: the subject's age, height, gender, and chronic pain state. Where sensor data cannot be obtained, a more lengthy question questionnaire is used, the extra questions making up for the absence of measured data.

In the first instance, the questionnaire data is processed in conjunction with the sensor data by a computer program or application (software) which processes the inputs automatically according to a first algorithm contained in the software. Where sensor data is not available, the answers to the longer questionnaire are processed alone, by a second algorithm.

It is useful to have both algorithms available in a store-based system, so that information can be obtained not only from shoppers, but also for absent sleep partners. Suppose, for example, one partner is present in the store. That person can answer the short questionnaire, and be measured on the test bed. Then, by completing the long-form questionnaire for a partner, and having that information processed by the second algorithm, a net recommendation can be generated, based on a calculation of the results of both computations.

The second algorithm is useful independently, as well, for example by people shopping via the internet, who lack access to the test bed and cannot produce sensor-based data. We believe the combination of questionnaire and sensor data produces the best results, but we have found the long-form questionnaire data to produce quite reliable results as well.

Figure 2:
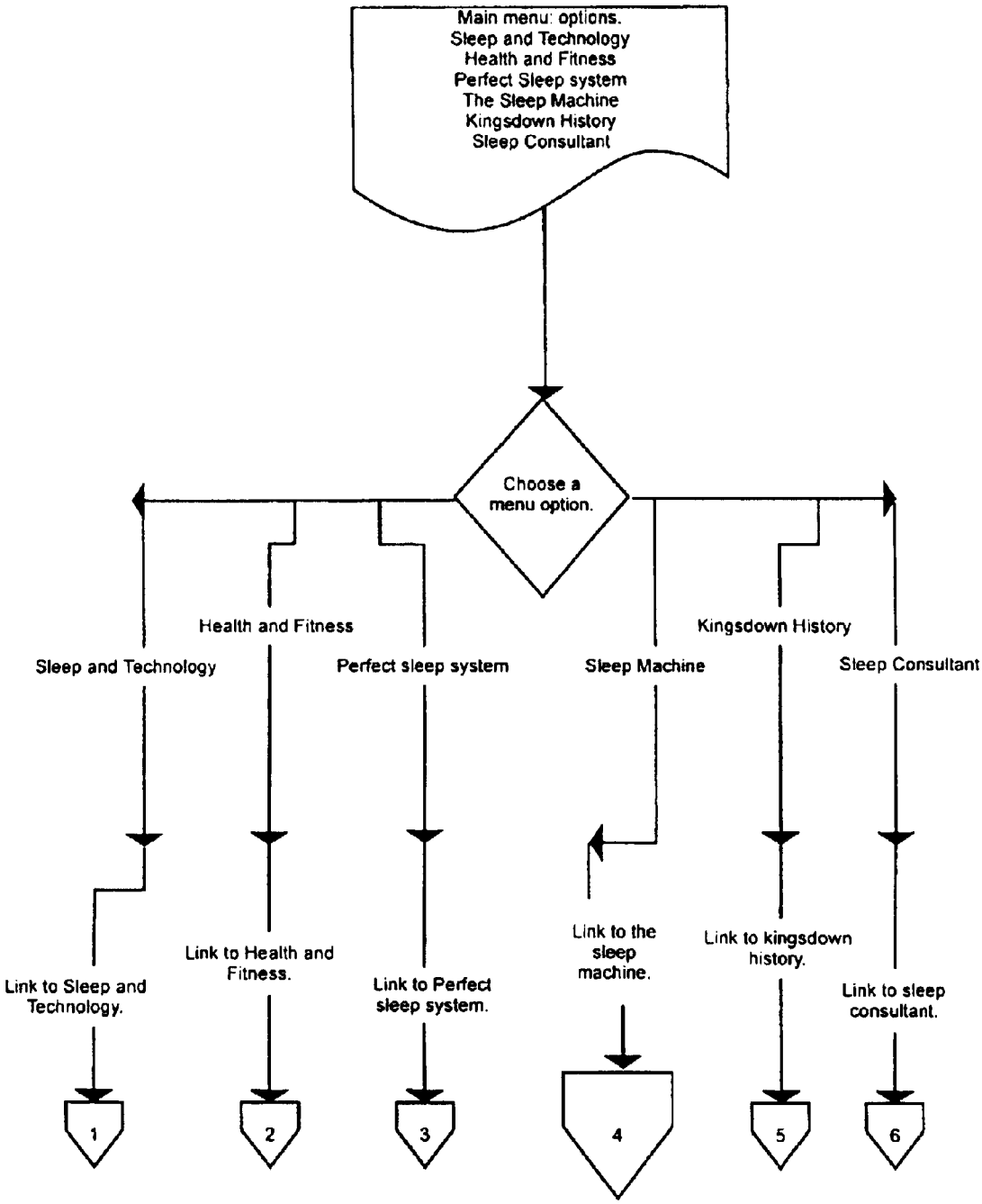
FIGS. 2–14 are schematic representations of a method for processing sleep attribute data and developing a bedding recommendation. In particular.
Figure 3:
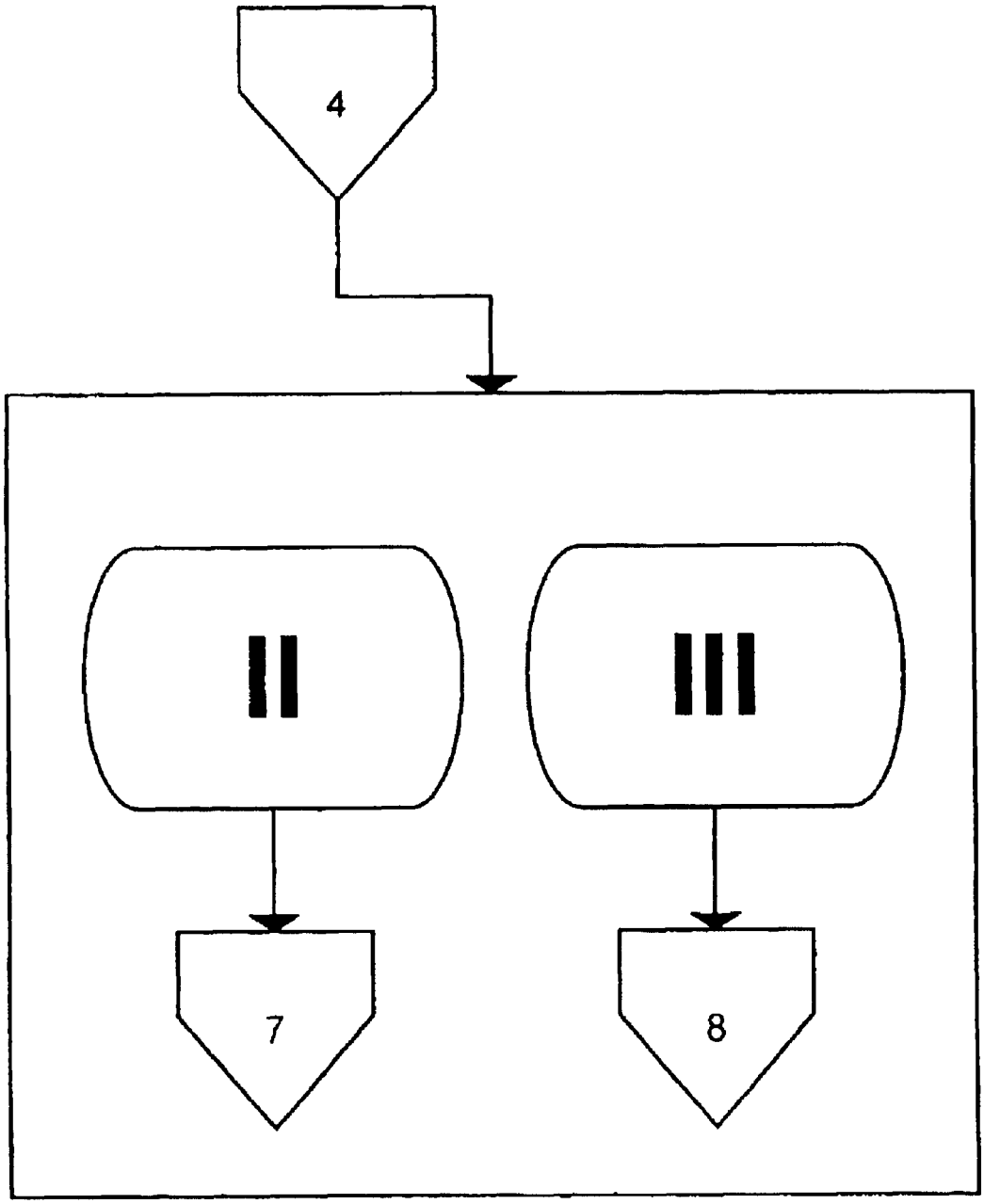
Figure 4:
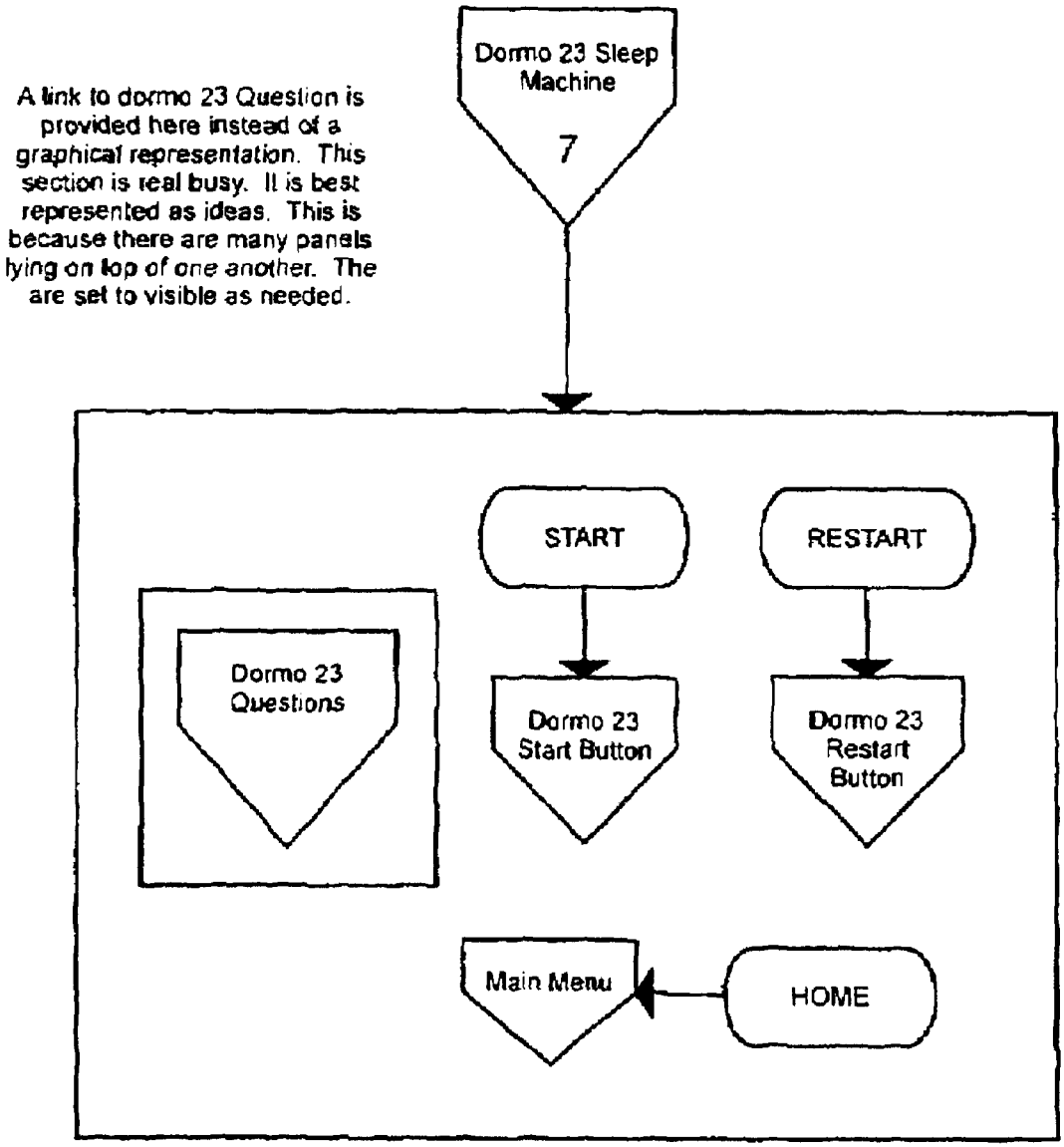
Figure 5:
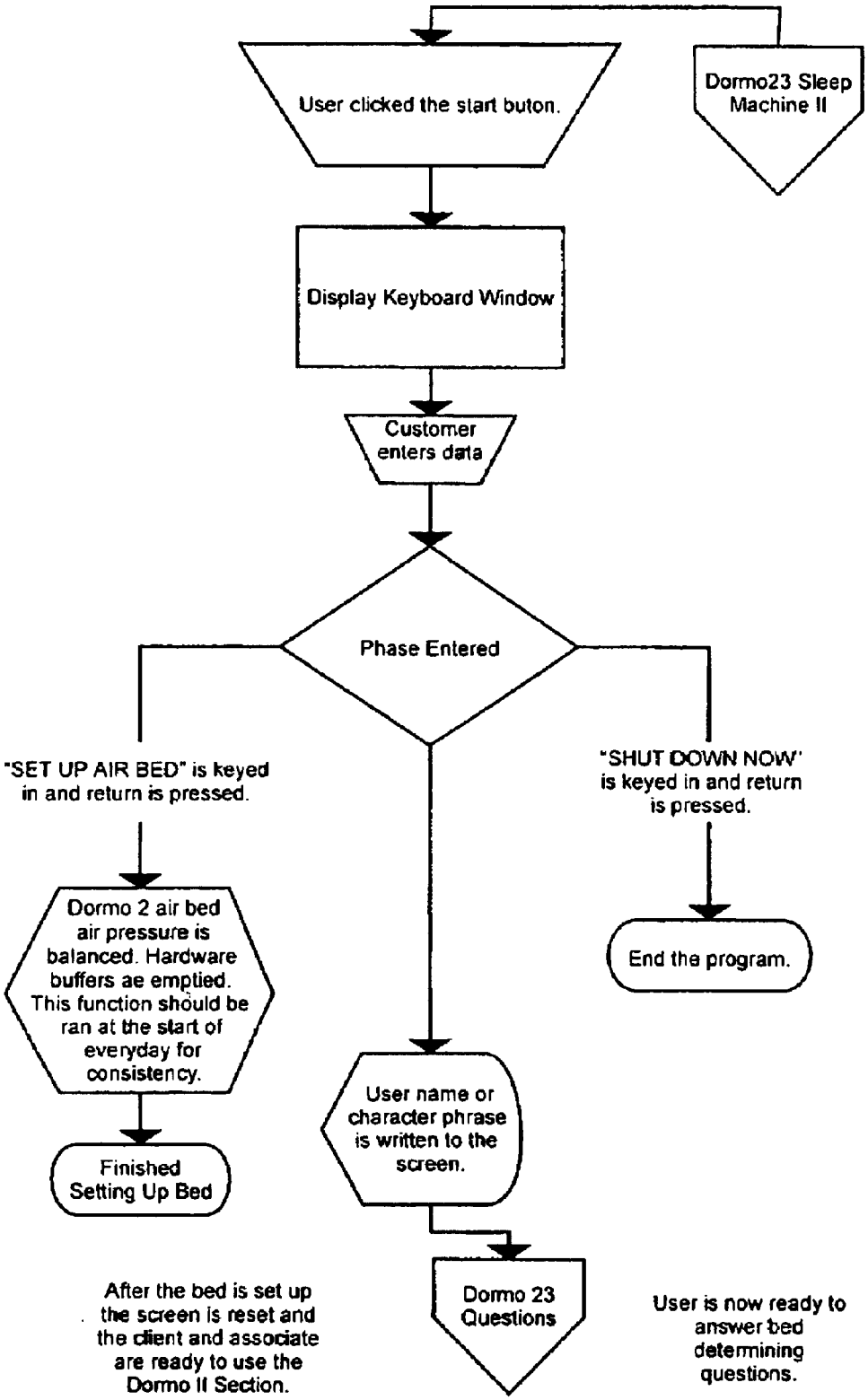

A particularly preferred implementation of the invention is shown in schematic form in FIGS. 2–14. As shown in FIG. 2, the welcome page of the monitor in the kiosk has six options, any of which can be selected by pointing to and clicking on the option (if a mouse is used), or by touching the item, if a touch screen is used. Alternatively, a keyboard could be used to make selections. (From here on, it will be assumed the display has a touch screen, and that selections are made simply by touching a particular area on the screen.) The main menu options are identified by numerals 1–6. Options 1, 2, 3, 5 and 6 lead to informational screens, or to applications (programs and data) not directly related to the present invention. They are therefore not discussed further. Selection of option #4 invokes the applications embodying this invention. There are two separate algorithms, as mentioned above; these are represented by options 7 and 8 in FIG. 3, which represents the two choices presented in the screen displayed upon selection of option 4. Option 7 is the short-form method mentioned above.

One initiates the short-form process by striking the Start button (FIG. 4) on the display. A virtual keyboard is then displayed, allowing one to "type" by touching the illustration. If the exact phrase "SHUT DOWN NOW" (FIG. 5) is entered, the program is ended. If the exact phrase "SET UP AIR BED" is entered, the air bed pressure is balanced, and hardware buffers are emptied. These exact phrases are expected to be entered only by store personnel. Any other entry is written to the screen.

Figure 6:
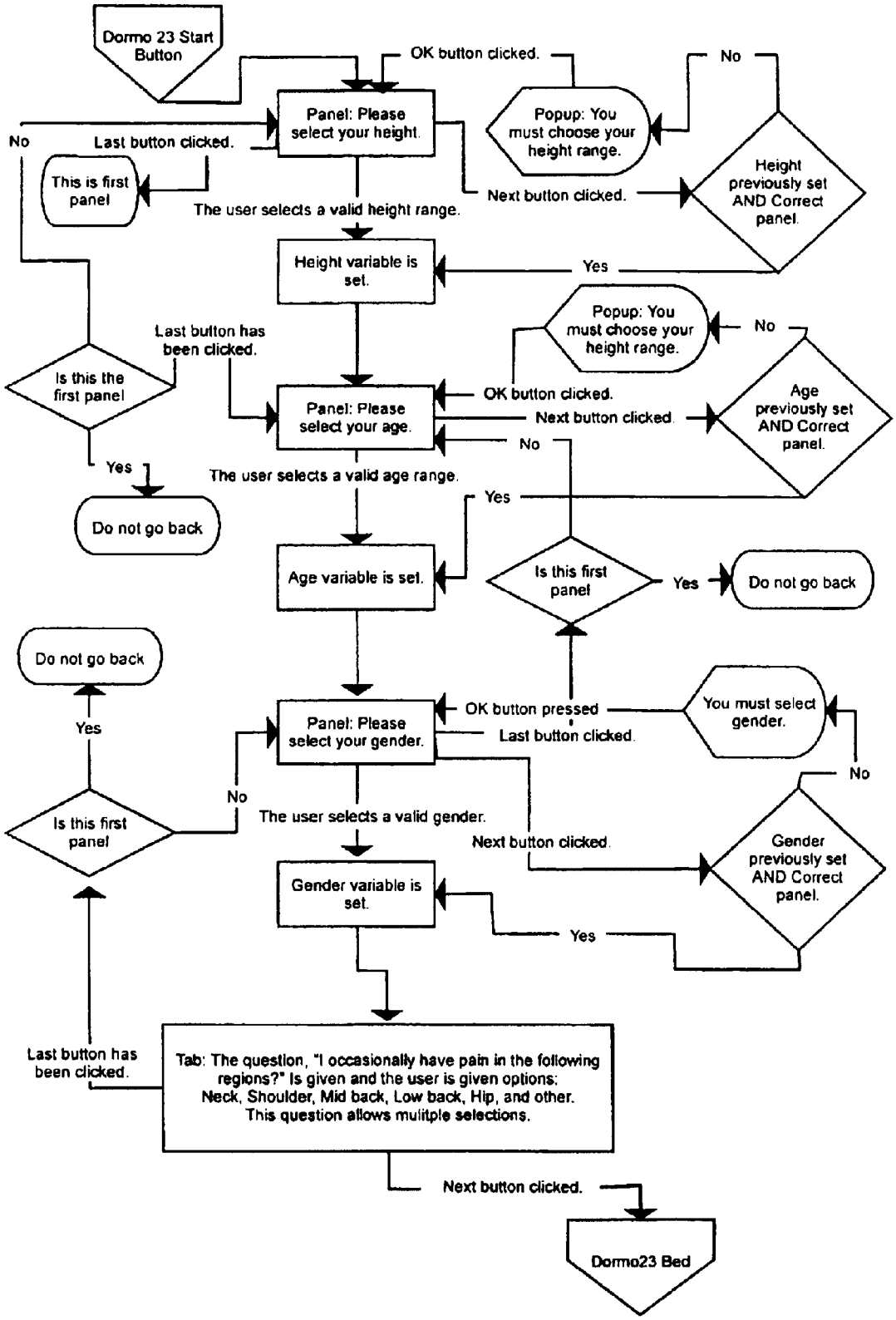
Figure 7:
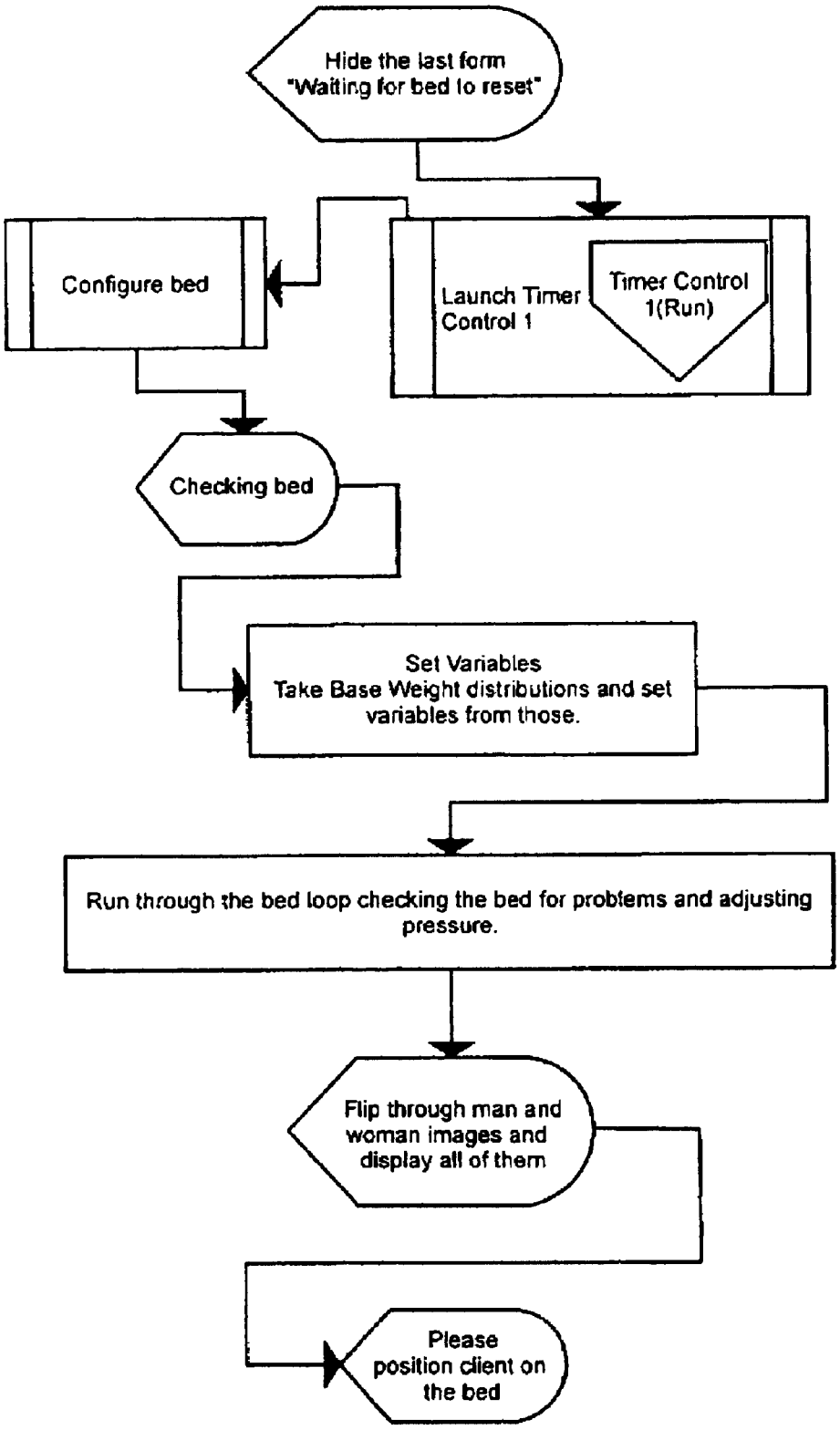

In FIG. 6, the user is then prompted to enter his height. Following validation of the height data (to be within a predetermined range), the entry is saved to a variable. Next, the user is prompted to enter his age, which is similarly validated and saved to a variable. A gender entry is similarly saved to a variable. Lastly, the user is asked whether he has occasional pain in the neck, shoulder, middle back, lower back, or other areas, and selects one or more items from that list, the selections being saved to variables.

Before the subject lies on the test bed, it must be set up by a program (FIG. 7) which inflates the pressure cells, checks for errors in the bed, and resets variables from base weight distributions.

Figure 8:
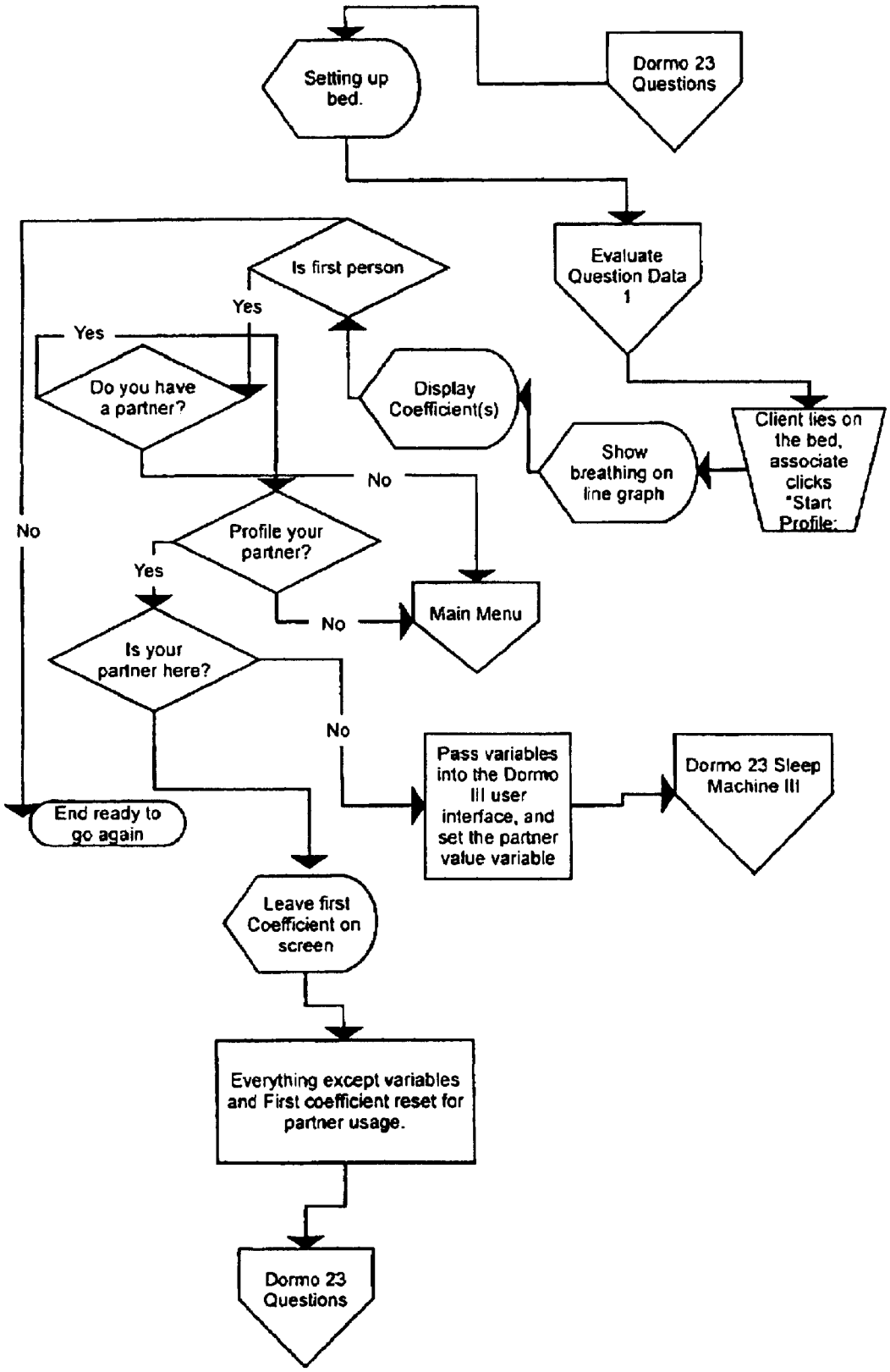
Figure 9:
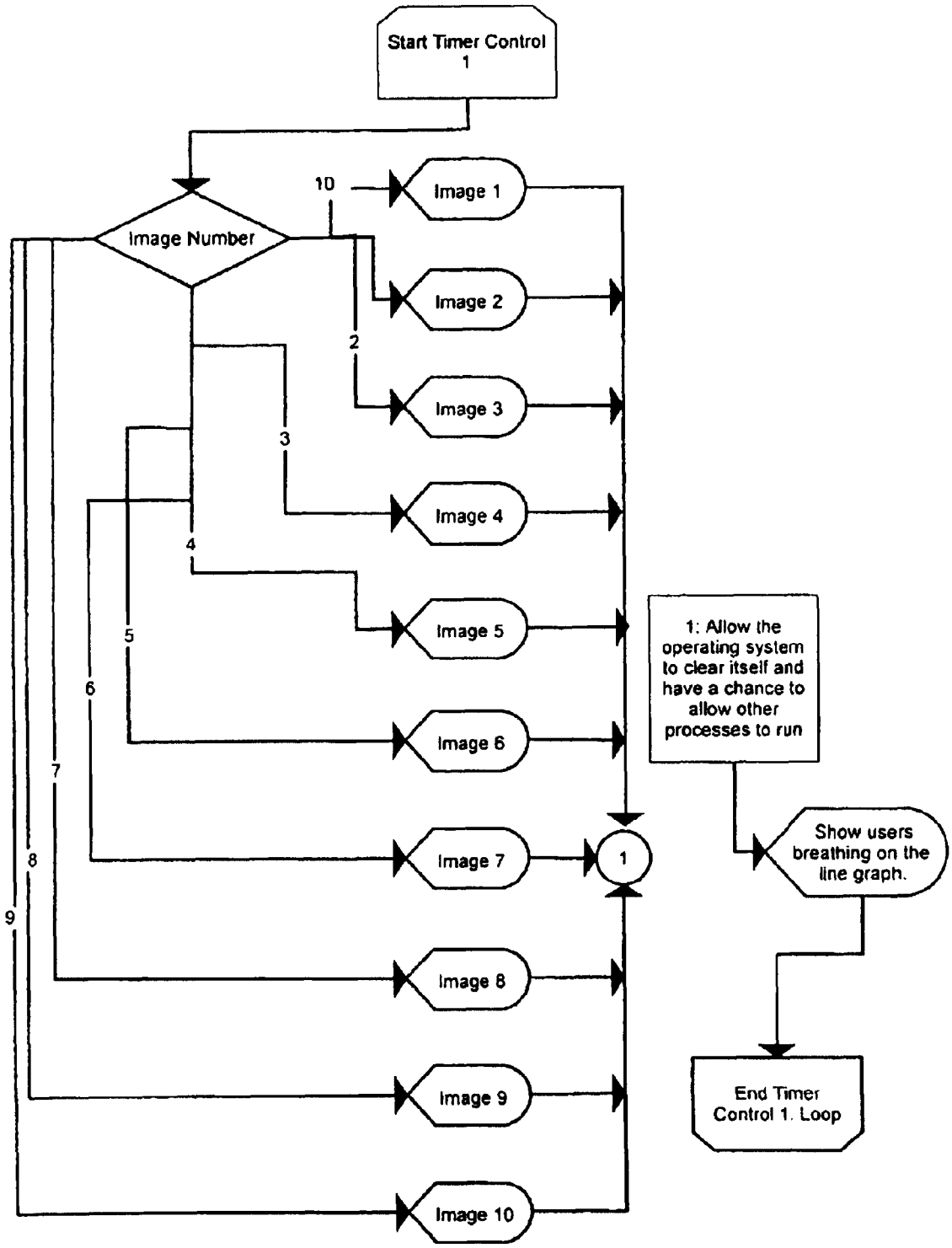
Figure 10:
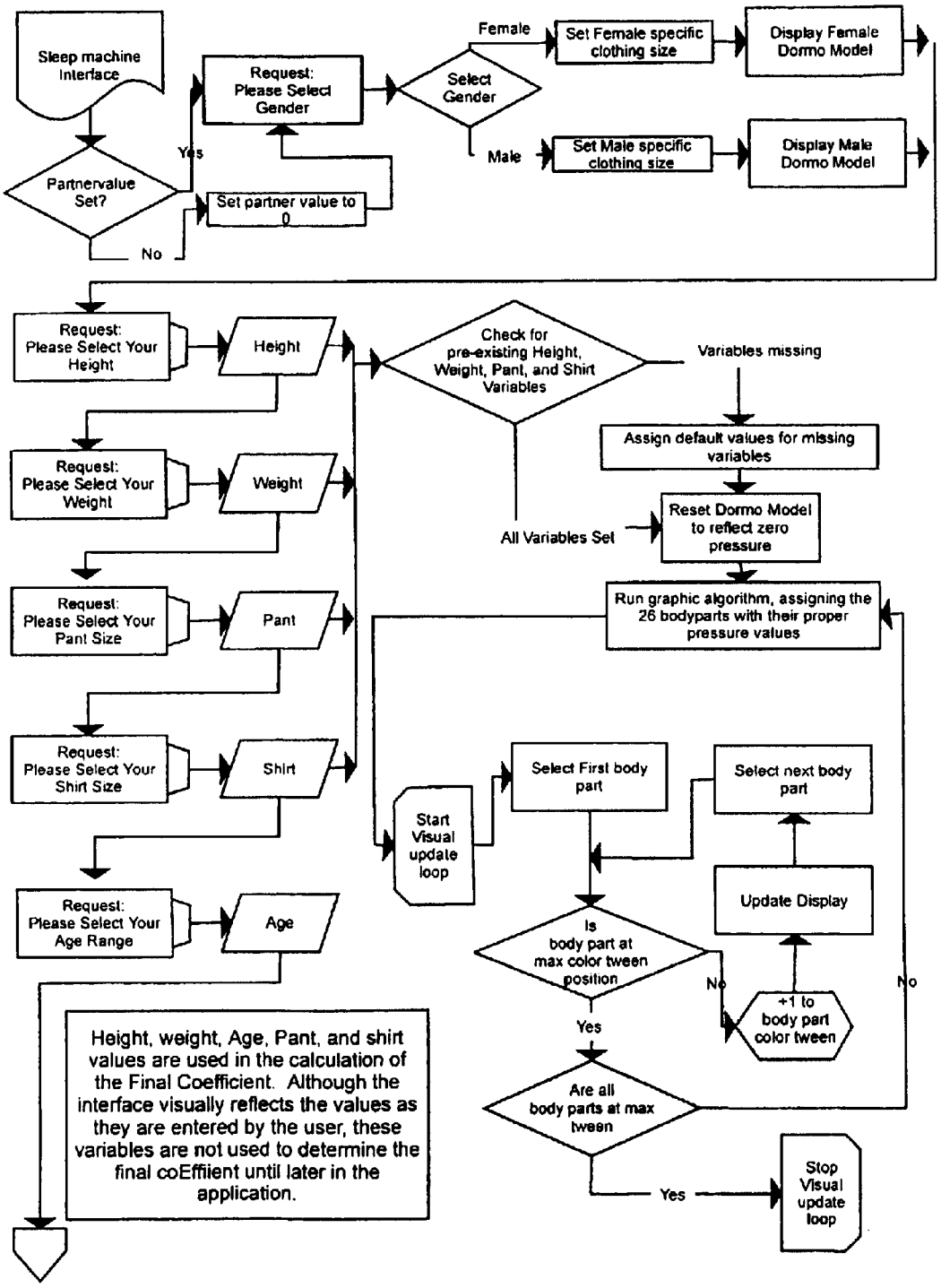
Figure 11:
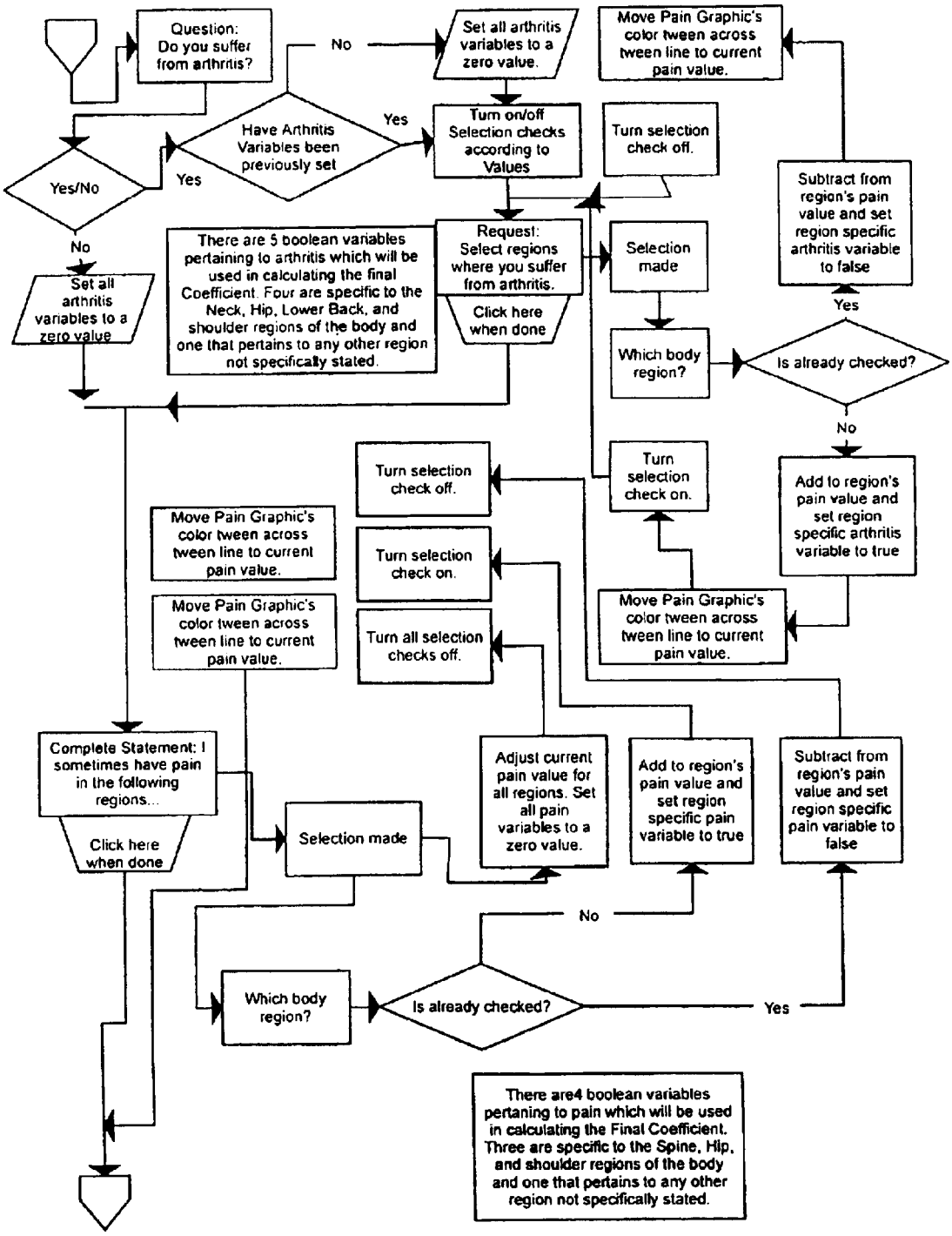
Figure 12:
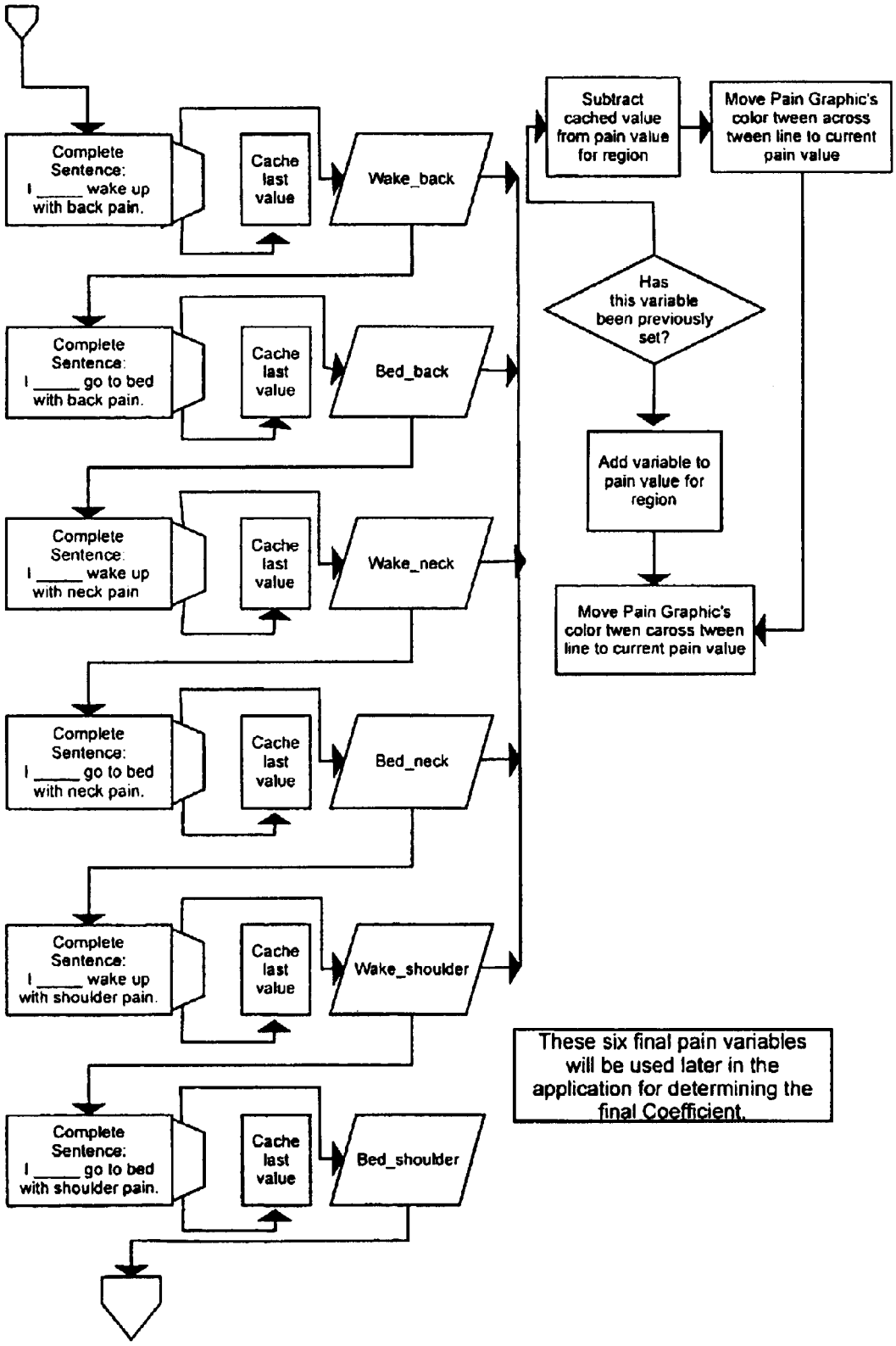
Figure 13:
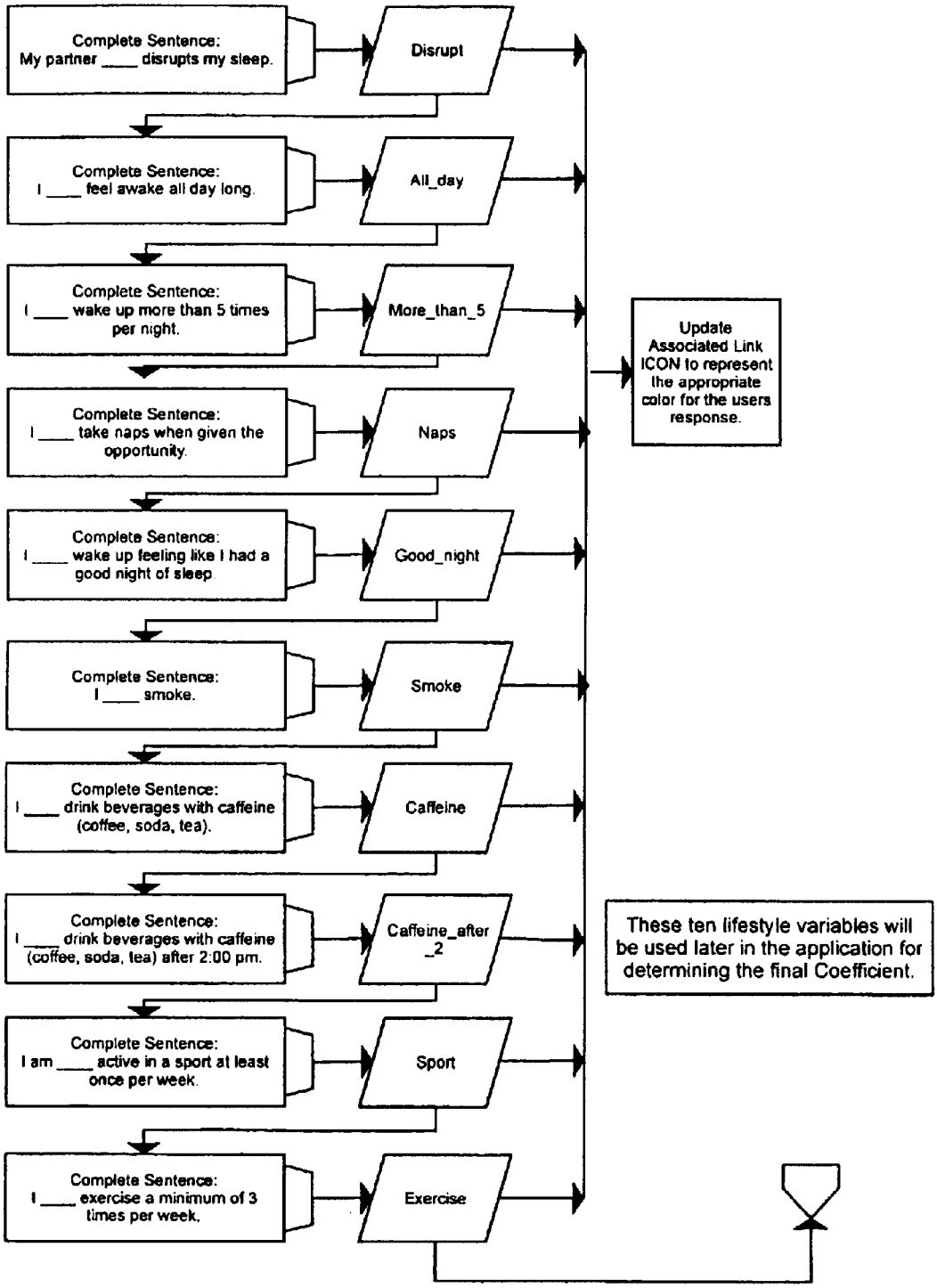
Figure 14:
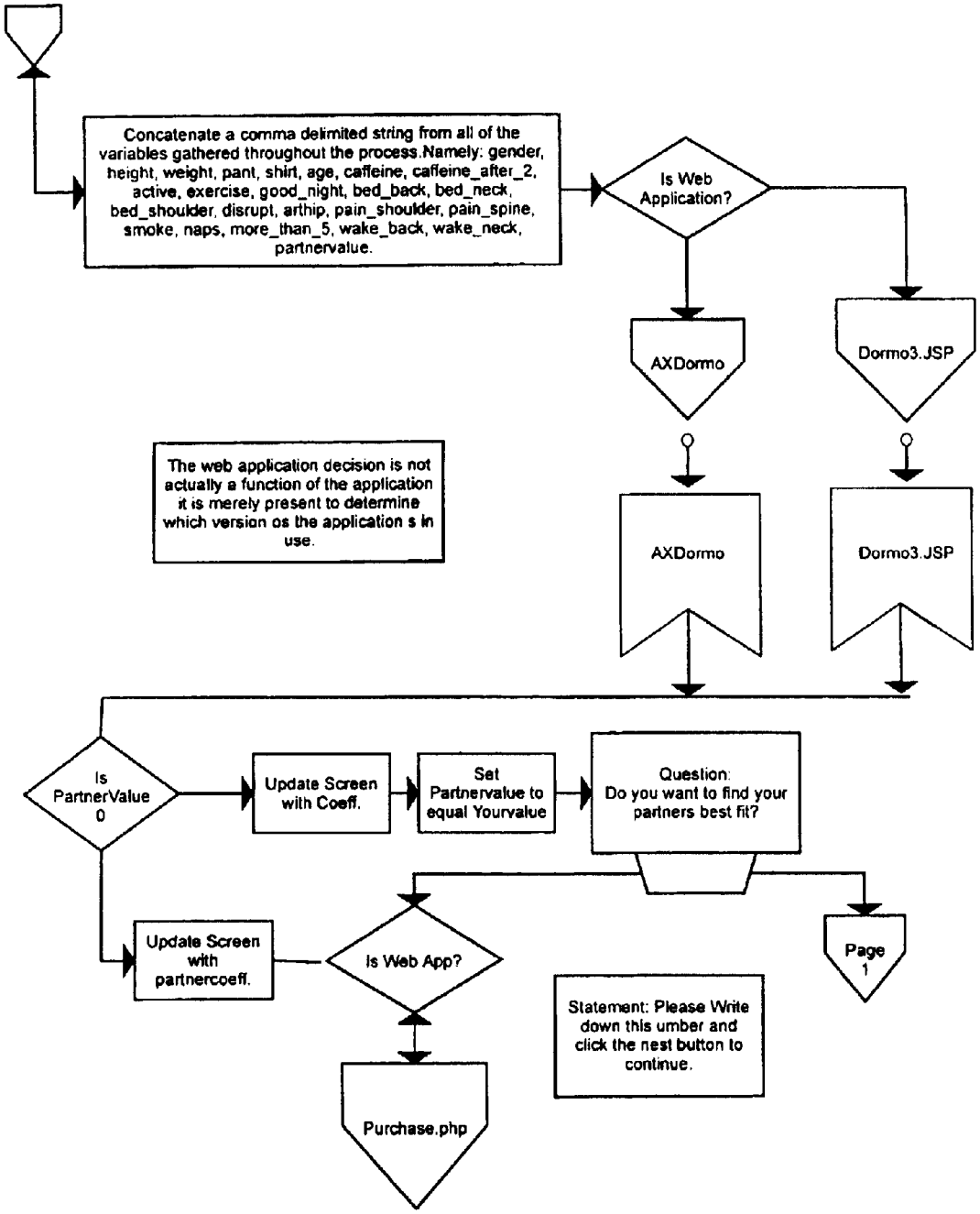

After the bed has been set up, the user is instructed to lie supine (face up) on the bed. An associate strikes a "Start Profile" button on the screen (FIG. 8). As the person lies on the bed, the pneumatic pressure in the four zones of the air mattress are monitored. The subject's breathing and body image (FIG. 9) may be represented graphically on the screen during this process. After a brief time, sufficiently long to achieve steady-state readings, the program samples the pressure signals, and combines them with the results of the questionnaire, to generate a "coefficient" representing the bedding (mattress and box spring combination) choice most appropriate for the subject. This coefficient is displayed prominently on the screen, and stored in memory.

Next, if the subject was the first person during the session to lie on the bed, he is asked (FIG. 8) whether he has a sleep partner. If there is an affirmative reply, and the second person is present, the second person is invited to respond to the short form questionnaire, following which he is instructed to lie on the bed, and the process described above is repeated. His values are combined with those of the first person, and a bed coefficient is determined which represents the best compromise choice for the two people.

If the subject answered that his partner was not present, he is offered an opportunity to answer the long-form questionnaire, represented in FIGS. 10–14, for the second person. Here, the questions are more numerous, but nevertheless should be answerable by an intimate partner: gender, height, weight, clothing sizes, age range and so on. All questions must be answered. The body image on the screen is altered to fit the answers to the questionnaire, as if the person were lying on the test bed.

A subsequent set of questions involve arthritic pain: multiple locations of such pain may be selected, and a graphic pain representation is added to the image.

The next set of questions related to bed-related pain: whether the missing person goes to bed with, or wakes up with, neck, shoulder or back pain. Answers are stored to variables, and the image representing the person is altered to illustrate the pain as appropriate.

The final set of questions elicit lifestyle information: whether the person's sleep is disrupted,
he feels awake all day long,
he wakes up more than five times per night,
he takes naps given the opportunity,
he feels he sleeps well,
he smokes,
he drinks caffeinated beverages,
he does so after 2:00 p.m.,
he is active in sports,
he exercises regularly.

The answers to the long-form questionnaire are processed and a best-fit bed coefficient for the missing partner is produced. This is combined with the first person's coefficient to produce a compromise best fit for the two people. Now the sales associate can show the user the selected bed having the correct bed coefficient, and the shopper will have greater assurance his selection will be a correct one.

Since the invention is subject to modifications and variations, it is intended that the foregoing description and the accompanying drawings shall be interpreted as only illustrative of the invention defined by the following claims.

We claim:

[1. A bedding marketing system for recommending one of a plurality of mattress systems having different physical characteristics, said system comprising a questionnaire for securing objective answers to questions about a person's physiological parameters, and means for automatically processing said answers to identify which of said plurality of mattress systems is physiologically most suitable for the person, wherein said questions elicit the person's age, the person's height, the person's gender and locations of the person's chronic pains.]

[2. The system of claim 1, wherein said questions elicit locations of pains the person goes to bed with, and wakes up with.]

[3. The system of claim 1, wherein said questions elicit lifestyle information including caffeine ingestion, sleeping habits, smoking habits, and exercise habits.]

[4. The system of claim 3, wherein said sleeping habits include whether a) the person's sleep is disrupted, b) he wakes up more than five times per night, c) he takes naps given the opportunity, and d) he feels he sleeps well.]

[5. The system of claim 3, wherein said exercise habits include whether a) the person is active in sports, and b) he exercises regularly.]

[6. A method for recommending one of a plurality of mattress systems having different physical characteristics, said method comprising securing from a person objective answers to questions about his physiological parameters, and automatically processing said answers to identify which of said plurality of mattress systems is physiologically most suitable for said person wherein said questions elicit the person's age, the person's height, the person's gender and locations of the person's chronic pains.]

[7. The method of claim 6, wherein said questions further include the person's weight, clothing sizes, and age range.]

[8. The method of claim 6, wherein said questions elicit locations of pains the person goes to bed with, and wakes up with.]

[9. The method of claim 6, wherein said questions elicit lifestyle information including caffeine ingestion, sleeping habits, smoking habits, and exercise habits.]

[10. The method of claim 9, wherein said sleeping habits include whether a) the person's sleep is disrupted, b) he wakes up more than five times per night, c) he takes naps given the opportunity, and d) he feels he sleeps well.]

[11. The method of claim 9, wherein said exercise habits include whether a) the person is active in sports, and b) he exercises regularly.]

[12. A bedding marketing system for recommending one of a plurality of mattress systems having different physical characteristics, said system comprising a questionnaire for securing objective answers to questions about person's physiological parameters, means for measuring said person's physiological parameters and producing physiological data, and means for automatically processing said answers and said data in combination to identify which of said plurality of mattress systems is physiologically most suitable for the person, wherein said questions elicit the person's age, the person's height, the person's gender and locations of the person's chronic pains.]

13. A bedding marketing system for recommending one of a plurality of mattress systems having different physical characteristics, said system comprising a questionnaire for securing objective answers to questions about a person's physiological parameters, means for measuring said person's physiological parameters and producing physiological data, and means for automatically processing said answers and said data in combination to identify which of said plurality of mattress systems is physiologically most suitable for the person, wherein the measuring means comprises a test bed having an air mattress divided into anatomical zones and the physiological data is representative of cell pressure in the respective zones.

*14. A system for recommending one of a plurality of bedding systems, said system comprising:*

*a questionnaire for securing answers to questions about a person's physiological parameters;*

*a measuring device which measures a person's physiological parameters and outputs data; and*

*a processor which processes said answers and said data and identifies which of said plurality of bedding systems is physiologically most suitable for the person,*

*wherein the measuring device comprises a test bed having a plurality of expandable zones; and*

*wherein the data relates to cell pressure in respective expandable zones.*

* * * * *